United States Patent [19]
Fukuda et al.

[11] Patent Number: 5,882,615
[45] Date of Patent: Mar. 16, 1999

[54] CLEANING AGENT AND CLEANING PROCESS FOR HARMFUL GAS

[75] Inventors: Hideki Fukuda; Kenji Otsuka; Satoshi Arakawa, all of Hiratsuka, Japan

[73] Assignee: Japan Pionics Co., Ltd., Tokyo, Japan

[21] Appl. No.: 677,978

[22] Filed: Jul. 10, 1996

[30] Foreign Application Priority Data

Jul. 28, 1995 [JP] Japan ................................ 212607/1995

[51] Int. Cl.$^6$ .............................. B01D 53/68; B01J 20/04
[52] U.S. Cl. ........................ 423/240 S; 502/400; 502/402
[58] Field of Search .................... 502/400, 402; 423/240 S; 23/293 R, 313 R

[56] References Cited

U.S. PATENT DOCUMENTS

| | | | |
|---|---|---|---|
| 4,535,072 | 8/1985 | Kitayama et al. | 502/411 |
| 4,826,805 | 5/1989 | Fukunaga et al. | 502/402 |
| 5,322,674 | 6/1994 | Mori et al. | 423/240 S |
| 5,338,709 | 8/1994 | Planes | 23/313 R |
| 5,670,445 | 9/1997 | Kitahara et al. | 423/240 S |
| 5,688,479 | 11/1997 | Chao | 423/240 S |

FOREIGN PATENT DOCUMENTS

| | | |
|---|---|---|
| 0 261 950 | 3/1988 | European Pat. Off. . |
| 464545 | 1/1992 | European Pat. Off. . |
| 43 23 647 | 1/1995 | Germany . |

*Primary Examiner*—Michael Lewis
*Assistant Examiner*—Peter DiMauro
*Attorney, Agent, or Firm*—Frishauf, Holtz, Goodman, Langer & Chick, P.C.

[57] ABSTRACT

There are disclosed a cleaning agent for removing a fluorine-compound gas such as hydrogen fluoride, fluorine, tungsten hexafluoride, silicon tetrafluoride and boron trifluoride which agent comprises a molded article produced by using strontium hydroxide as a principal component, an organic binding agent as a molding agent and the hydroxide of an alkaline earth metal other than strontium as a molding aid; and a process for cleaning a harmful gas which comprises feeding a harmful gas containing a fluorine-compound gas into a column packed inside with the above cleaning agent to remove the fluorine-compound gas; and exhausting a gas substantially free from the fluorine-compound gas. The above cleaning agent is capable of removing the fluorine-compound gas in high efficiency without causing any danger, thereby making itself well suited to the cleaning of the gases exhausted, for example, from semiconductor manufacturing industries.

12 Claims, No Drawings

CLEANING AGENT AND CLEANING PROCESS FOR HARMFUL GAS

BACKGROUND OF THE INVENTION

1. Field of the Invention

The present invention relates to a cleaning agent for a harmful gas containing a fluorine gas or a fluorine-compound gas (hereinafter referred simply to as "fluorine-compound gas") and to a process for cleaning the harmful gas by using the cleaning agent. More particularly, it pertains to a cleaning agent useful for removing a harmful fluorine-compound gas containing fluorine atoms such as hydrogen fluoride, fluorine, tungsten hexafluoride, silicon tetrafluoride and boron trifluoride that are used mainly in semiconductor manufacturing industries and then exhausted therefrom, and to a process for cleaning the above-mentioned harmful gas thus exhausted by the use of the aforementioned cleaning agent.

2. Description of Related Arts

There has been a steady rise in the kinds and consumption of fluorine-compound gases such as hydrogen fluoride, fluorine, tungsten hexafluoride, silicon tetrafluoride and boron trifluoride in recent years as semiconductor industry and optoelectronics industry continue to develop.

These fluorine-compound gases are indispensable for the growth of the film of crystalline silicon, amorphous silicon or silicon oxide or as etching gas in the production industries of silicon semiconductors and compound semiconductors. These flourine-compound gases are used in semiconductor manufacturing industries or the like as such or after being diluted with helium, argon, nitrogen, hydrogen or the like, and thereafter are exhausted therefrom as such or after being diluted with a gas such as nitrogen or air, and accordingly, the concentration of the exhaust gas is not always constant.

Since each of these fluorine-compound gases exerts an undesirable influence on human bodies and the environment on account of its high toxicity, it is necessary to clean a harmful gas containing any of these fluorine-compound gases after being used in the semiconductor manufacturing process prior to the discharge in the atmosphere.

As the means for removing a fluorine-compound gas or other halogen gas or a halogen-compound gas (hereinafter referred simply to as "halogen-compound gas") that is contained in an exhaust gas, there have heretofore been used, as a wet process, a process in which a harmful halogen-compound gas is brought into contact with an aqueous solution of an alkali such as sodium hydroxide to absorb and decompose the gas in a scrubber, spray tower, rotary fine-bubble generating unit or the like (refer to Japanese Patent Application Laid-Open Nos. 204022/1986, 125827/1987, etc.) and, as a dry process, a process in which a harmful halogen-compound gas is passed through a packed column which is packed inside with a cleaning agent in solid form comprising, as an effective ingredient, an oxide, carbonate or the like of magnesium, sodium or potassium (refer to Japanese Patent Application Laid-Open Nos. 232844/1988, 68051/1985, etc.) or a cleaning agent in solid form comprising soda lime as an effective ingredient to clean the harmful gas.

However, the above-mentioned wet process involves in general the problems that difficulties arise in the post-treatment of the liquid used for removing a halogen-compound gas and the process not only requires complicated large equipment but also needs much expense in equipment and maintenance. On the other hand, the aforesaid dry process in which an adsorbent such as an oxide, carbonate or the like of magnesium, sodium or potassium is frequently used, suffers from the disadvantage of low removal capacity for fluorine-compound gas per unit volume of the adsorbent. There is also known a cleaning agent obtained by impregnating activated carbon with an aqueous solution of a zinc compound and an alkali metal compound. The cleaning agent just mentioned, however, involves the problems that the removal capacity for the harmful gas is insufficient as is the case with the above-mentioned adsorbent, thus failing to cope well with a concentrated fluorine-based gas when exhausted or with a large amount of gas to be treated. In addition, in the case of treating a highly reactive gas such a fluorine, the activated carbon-compound cleaning agent is involved in a possible danger that fire due to its flammability could break out.

In the case of the aforesaid cleaning agent in solid form by the use of soda lime, the cleaning capacity for the harmful gas is somewhat higher than that of any other cases, but the cleaning agent involves the problems that said agent is dried out, and when the exhauted fluorine-compound gas has a low concentration, the cleaning capacity is reduced to a great extent.

Under such circumstances, it has long been desired to realize a cleaning agent and cleaning process that have excellent cleaning capacity for a harmful gas containing various fluorine-compound gases in low concentrations and in a dry state which gas is exhausted from a semiconductor manufacturing industry or the like, and that are capable of removing said gas in high efficiency without any danger of causing fire at the time of cleaning.

SUMMARY OF THE INVENTION

In view of the above, intensive research and investigation were carried out by the present inventors in order to solve the above-mentioned problems. As a result it has been found that the use, at the same time, of strontium hydroxide as a principal component of a cleaning agent, of an organic binding agent as a molding agent, and of the hydroxide of an alkaline earth metal other than strontium as a molding aid, not only exhibits excellent performance for the removal of fluorine-compound gas and resultingly for the cleaning of a harmful gas, but also maintains the removal performance without deterioration even if the harmful exhaust gas containing fluorine-compound gases is in a dry state and low in concentrations of fluorine-compound gases, and beside assures excellent safety free from a fear of causing fire in contrast to the case of using activated carbon. The present invention has been accomplished on the basis of the foregoing finding and information.

Specifically the present invention relates mainly to a cleaning agent for removing a fluorine-compound gas contained in a harmful gas by bringing said harmful gas into contact therewith which agent comprises a molded article produced by the use of strontium hydroxide as a principal component, an organic binding agent as a molding agent and the hydroxide of an alkaline earth metal other than strontium as a molding aid, and a process for cleaning a harmful gas which comprises feeding a harmful gas containing a fluorine-compound gas in a packed column packed inside with said cleaning agent at an end of said column to remove the fluorine-compound gas and exhausting a gas substantially free from the fluorine-compound gas at the other end thereof.

DESCRIPTION OF PREFERRED EMBODIMENT

The cleaning agent according to the present invention is applied to the cleaning of a harmful gas containing fluorine-compound gases which is an exhaust gas exhausted from a semiconductor manufacturing process unit or the like.

Examples of the harmful gas that is the object of cleaning include at least one from among hydrogen fluoride, fluorine, boron trifluoride, tungsten hexafluoride, and silicon tetrafluoride and a mixed gas formed by diluting any of the above-exemplified fluorine-compound gas with nitrogen, argon, helium, air or the like.

Strontium hydroxide, which is used as a principal component for the purpose of exhibiting the cleaning function in the molded cleaning agent according to the present invention, can be produced, for example, by the reaction of strontium chloride and sodium hydroxide. Strontium hydroxide hydrates [$Sr(OH)_2 \cdot nH_2O$], available on the market, for example, as octahydrate having a purity not less than 98%, can be usually used for the aforesaid purpose.

Strontium hydroxide in the form of octahydroxide can be used, of course, as it is as mentioned above and in addition, there are usable the monohydrate which is relatively easily obtained as a stable product by heating the octahydrate to around 80° C., and also an anhydride free from water of crystallization.

The cleaning agent for a harmful exhaust gas, when used in an industrial scale, is packed, in the first place, in a cleaning column (or tower), through which an exhaust gas is passed from one end thereof to the other end. The cleaning agent in the form of fine powder is not industrially practical, since such tends to bring about a high pressure loss in the column. In view of the foregoing problem, the present invention provides an industrially useful cleaning agent which is enhanced in cleaning capacity and minimized in pressure loss by molding the agent into a desired shape in place of the above-mentioned powder.

With regard to the molding method, the cleaning agent is molded by adding a molding agent and a molding aid to strontium hydroxide as the principal component of the agent.

The molding agent, which is employed for the purpose of enhancing the moldability and molding strength of the cleaning agent, is selected for use from among organic polymers having binding properties that are exemplified by polyvinyl alcohol, polyethylene glycol, polypropylene glycol, methyl cellulose and carboxymethyl cellulose. The molding agent is used alone or in combination with at least one other. The amount of the molding agent to be added is determined by the amount of water of crystallization in strontium hydroxide and the molding conditions, and is usually 0.1 to 40, preferably 0.5 to 20 parts by weight on the basis of 100 parts by weight of strontium hydroxide expressed in terms of anhydride.

The molding aid, which is employed for the purpose of further enhancing the moldability of the cleaning agent, is selected for use from among the hydroxides of an alkaline earth metals other than strontium that are exemplified by magnesium hydroxide [$Mg(OH)_2$], calcium hydroxide [$Ca(OH)_2$] and barium hydroxide [$Ba(OH)_2$]. The above-exemplified species available on the market can be used as the molding aid.

The use of any of the hydroxides of alkaline earth metals other than strontium enables the cleaning agent to be further enhanced in moldability based on the use thereof without lowering the cleaning capacity of the strontium hydroxide as the principal component. Moreover, the molding aid itself is favorably imparted with cleaning capacity.

It is extremely advantageous that the simultaneous use of the strontium hydroxide as the principal component with the hydroxide of an alkaline earth metal other than strontium as the molding aid exerts a synergistic effect on enhancing the functions of removing fluorine-compound gases and cleaning harmful gases when a specific gaseous species such as fluorine, hydrogen fluoride or the like is the object of removal. The above-mentioned hydroxide as the molding aid may be used alone or in combination with at least one other.

The blending ratio of the hydroxides of alkaline earth metals other than strontium as the molding aid to strontium hydroxide as the principal component governs the cleaning capacity. An unreasonably high ratio thereof results in decrease in the cleaning capacity, whereas an unreasonably low ratio thereof causes a tendency to decrease the cleaning capacity and besides to deteriorate the moldability. The molar ratio of the hydroxides of alkaline earth metals in total other than strontium (abbreviated to M) to the strontium hydroxide (abbreviated to Sr), that is, M/Sr is usually preferably 0.05, based on the strontium hydroxide expressed in terms of an anhydride thereof to 1, more preferably 0.1 to 0.5, based on the strontium hydroxide expressed in terms of an anhydride thereof.

The capacity of the cleaning agent according to the present invention for removing a fluorine-compound gas is sufficiently high even for a slight amount of moisture in said agent, but the agent is preferably allowed to contain an appropriate amount of moisture for the purpose of further enhancing the removal capacity. The moisture content therein including moisture when present in strontium hydroxide as a hydrate is usually preferably at most 30%, more preferably at most 15% by weight.

There are available a variety of methods for molding the cleaning agent, that are exemplified by a method comprising the steps of preliminarily mixing strontium hydroxide as the principal component with the hydroxide of an alkaline earth metal other than strontium as the molding aid in a prescribed ratio, adding an aqueous solution of an organic binding agent as the molding agent to the resultant mixture under stirring, extrusion molding the resulting slurry or cake, cutting the extruded product into pellets of an appropriate length, and drying the resultant pellets in a dryer so as to attain a prescribed moisture content to finalize the cleaning agent; a method in which the above-obtained slurry or cake is dried, then ground, and the ground product is tableted to produce the cleaning agent; a method in which said slurry or cake is molded into a granular form by means of a granulating machine, etc; and like methods.

The molding method is not limited to the above-exemplified method, but a variety of methods are adoptable as the methods for preparing the cleaning agent according to the present invention insofar as they can uniformly mix the aforesaid components in a prescribed ratio and mold the mixed components into the cleaning agent. It is preferable in general, however, that the cleaning agent in the form of a pellet be produced by extrusion molding from the viewpoint of easiness in selecting the shape, size, etc. of the molded product.

There is no limitation on the shape and size of the molded product. The shape of the molded product is typified by the form of sphere, column, cylinder, granular or the like. The size of the molded product is preferably 0.5 to 10 mm in diameter for a sphere, 0.5 to 10 mm in diameter and 2 to 20 mm in height for a column such as a pellet and a tablet, and 0.8 to 6 mm in mesh opening of a sieve for an irregular form such as a granule and a crushed product.

The packing density of the molded product packed in a cleaning column is usually 0.4 to 2.0 g/milliliter (mL), approximately.

The cleaning agent according to the present invention, when used for cleaning of the gas, can be used as any of a fixed bed, moving bed and fluidized bed, among which a fixed bed is usually used. The cleaning agent is packed in a cleaning column, and brings the harmful gas containing a fluorine-compound gas which passed through the column into contact therewith so that the fluorine-compound gas as the harmful component is removed from the exhaust gas.

The concentration of the fluorine-compound gas in the harmful gas to which the cleaning agent according to the present invention is preferably applicable, is not specifically limited, but is usually in the range of several ten thousands ppm as a high concentration to several ppm as a low concentration against a gas exhausted from a semiconductor manuafacturing process.

The volumetric capacity of the cleaning column is designed according to the concentration of fluorine-compound gases, the quantity of the harmful gas as the object of cleaning, permissible pressure loss through the column and the like. The inside diameter of the cleaning column is designed so that the superficial linear velocity (LV) of the gas flowing therethrough is set to 0.1 to 150 cm/sec. The packing length of the cleaning agent in the cleaning column varies depending upon the flow rate of the gas to be cleaned, the concentration of the harmful gas and the like, and can't be unequivocally determined. However, it is usually set to 50 to 1500 mm, approximately from the practical point of view. In general, the above-mentioned conditions are determined by the pressure loss through the packed bed, the efficiency of contact with the gas, the concentration of the fluorine-compound gases, etc.

The contact temperature between the harmful gas and the cleaning agent is usually 0° to 90° C., preferably 0° to 40° C., that is, around room temperature without a need for heating or cooling in particular. After the start of contact therebetween, the contact temperature sometimes rises to some extent due to the heat of reaction depending upon the type, concentration, etc. of the fluorine-compound gases to be removed, however, there is no fear of hazard such as fire because of the non-usage of combustibles such as activated carbon.

The pressure of the harmful gas at the time of contact with the cleaning agent is not specifically limited, but is usually atmospheric pressure. It is possible to operate the cleaning system under reduced pressure or under pressure, for example at 0.5 to 2 kg/cm$^2$ abs.

In the following the present invention will be described in more detail with reference to comparative examples and working examples, which however shall not be construed to limit the present invention thereto.

EXAMPLE 1

Strontium hydroxide octahydrate [Sr(OH)$_2$•8H$_2$O] with 99% purity in an amount of 248 g was dried at 80° C. for 18 hours in a dryer to afford dried strontium hydroxide in an amount of 130 g, which was equivalent to the weight of monohydrate thereof. Then, 130 g of the Sr(OH)$_2$•H$_2$O thus obtained was mixed with 35 g of calcium hydroxide (extra pure reagent, produced by Kanto Chemical Co., Inc.) in a Sr(OH)$_2$:Ca(OH)$_2$ molar ratio of 1:0.5, and the resultant mixture was incorporated with a solution of 8 g of polyvinyl alcohol (PVA, produced by Sin-Etsu Chemical Co., Ltd. under the trade name "PA-05") in 48 g of water under stirring. The resultant cake was extruded through a 1.6 mm diameter nozzle in a nozzle plate, and the extruded product was cut into pellets of about 3 to 5 mm in length, which were dried at 100° C. for about 24 hours in a dryer to afford 160 g of a cleaning agent A having a bulk density of 0.60 g/mL.

A measurement was made of the moisture content of the cleaning agent A by means of a dry weight type moisture meter (produced by Chino Corporation under the trade name "CZA 1000"), with a result that the moisture content was 0.9% by weight.

Subsequently 125.6 mL of the cleaning agent A was packed in a quartz-glass made cleaning column with 40 mm inside diameter and 200 mm length, in a packed length of 100 mm. Then, nitrogen containing gaseous tungsten hexafluoride in 1000 ppm concentration was passed through the cleaning column at 20° C. under atmospheric pressure at a flow rate of 2260 mL/min (superficial linear velocity LV of 3 cm/sec), and the break through time was measured to obtain the amount of the gaseous tungsten hexafluoride removed per one liter (L) of the cleaning agent.

The break through of the gaseous tungsten hexafluoride was detected by sampling the gas exhausted from the column at the outlet thereof and using a detector for fluoride (produced by Bionics Instrument Manufactureing Co., Ltd. under the trade name "TG-3700"). The lower detection limit for gaseous tungsten hexafluoride was 0.6 ppm. The chemical composition of the cleaning agent A and the results of the gas cleaning test are given in Table 1 and Table 2, respectively.

EXAMPLES 2 to 6

Strontium hydroxide octahydrate [Sr(OH)$_2$•8 H$_2$O] in an amount of 247 g was mixed with 35 g of calcium hydroxide, and the resultant mixture was incorporated with a solution of 8 g of polyvinyl alcohol in 48 g of water under stirring. The resultant cake was made into 158 g of a cleaning agent B having a bulk density of 0.57 g/mL and a moisture content of 1.2% by weight in the same manner as in Example 1.

The resultant cleaning agent B was subjected to cleaning tests five times for nitrogen gas containing any of tungsten hexafluoride, silicon tetrafluoride, boron trifluoride, fluorine and hydrogen fluoride each in 1,000 ppm concentration in the same manner as in Example 1.

The break through of the gaseous harmful component was detected by sampling the gas exhausted from the column at the outlet thereof and using any of detectors for fluorine-compound gases (produced by Bionics Instrument Manufacturing Co., Ltd.). The lower detection limit for each of the fluorine-compound gases is given in the following.

| Fluorine-compound gas | Detector | Lower detection limit (ppm) |
| --- | --- | --- |
| tungsten hexafluoride | TG-3700 | 0.6 |
| silicon tetrafluoride | TG-3700 | 0.6 |
| boron trifluoride | TG-3700 | 0.6 |
| fluorine | TG-1400 | 0.2 |
| hydrogen fluoride | TG-700 | 0.6 |

The chemical composition of the cleaning agent B and the results of the gas cleaning tests are given in Table 1 and Table 2, respectively.

EXAMPLE 7

Strontium hydroxide octahydrate [Sr(OH)$_2$•8 H$_2$O] in an amount of 247 g was mixed with 35 g of calcium hydroxide, and the resultant mixture was incorporated with a solution of 8g of methyl cellulose (abbreviated to MC, produced by Kanto Chemical Co., Inc.) in 48 g of water under stirring.

The resultant cake was made into 160 g of a cleaning agent C having a bulk density of 0.58 g/mL and a moisture content of 1.0% by weight in the same manner as in Example 1.

The resultant cleaning agent C was subjected to a cleaning test for nitrogen gas containing tungsten hexafluoride in 1,000 ppm concentration in the same manner as in Example 1. The chemical composition of the cleaning agent C and the results of the gas cleaning test are given in Table 1 and Table 2, respectively.

EXAMPLE 8

The procedure in Example 2 was repeated to produce 135 g of cleaning agent D except that calcium hydroxide was added in an amount of 7 g instead of 35 g of the same to strontium hydroxide.

The resultant cleaning agent D, which had a bulk density of 0.55 g/mL and a moisture content of 1.2% by weight, was subjected to a cleaning test for nitrogen containing tungsten hexafluoride in 1,000 ppm concentration in the same manner as in Example 1. The chemical composition of the cleaning agent D and the results of the gas cleaning test are given in Table 1 and Table 2, respectively.

EXAMPLE 9

The procedure in Example 2 was repeated to produce 181 g of cleaning agent E except that 54 g of magnesium hydroxide [$Mg(OH)_2$] (extra pure reagent, produced by Kanto Chemical Co., Inc.) was used in place of calcium hydroxide.

The resultant cleaning agent E, which had a bulk density of 0.65 g/mL and a moisture content of 1.2% by weight, was subjected to a cleaning test for nitrogen containing tungsten hexafluoride in 1,000 ppm concentration in the same manner as in Example 1. The chemical composition of the cleaning agent and the results of the gas cleaning test are given in Table 1 and Table 2, respectively.

EXAMPLE 10

The procedure in Example 2 was repeated to produce 209 g of cleaning agent F except that 80 g of barium hydroxide octahydrate [$Ba(OH)_2 \cdot 8 H_2O$] (extra pure regent, produced by Kanto Chemical Co., Inc.) was used in place of calcium hydroxide.

The resultant cleaning agent F, which had a bulk density of 0.68 g/mL and a moisture content of 1.3% by weight, was subjected to a cleaning test for nitrogen containing tungsten hexafluoride in 1,000 ppm concentration in the same manner as in Example 1. The chemical composition of the cleaning agent F and the results of the gas cleaning test are given in Table 1 and Table 2, respectively.

EXAMPLE 11

Strontium hydroxide octahydrate [$Sr(OH)_2 \cdot 8 H_2O$] in an amount of 247 g was mixed with 35 g of calcium hydroxide and 54 g of magnesium hydroxide, and the resultant mixture was incorporated with a solution of 8 g of polyvinyl alcohol in 48 g of water under stirring. The resultant cake was made into 215 g of a cleaning agent G having a bulk density of 0.64 g/mL and a moisture content of 0.9% by weight in the same manner as in Example 1.

The resultant cleaning agent G was subjected to a cleaning test for nitrogen gas containing tungsten hexafluoride in 1,000 ppm concentration in the same manner as in Example 1. The chemical composition of the cleaning agent G and the results of the gas cleaning test are given in Table 1 and Table 2, respectively.

Comparative Example 1

Soda lime (Soda lime No. 2, produced by Wako Pure Chemical Industries Ltd.) with a particle diameter of 3.5 to 5.5 mm in an amount of 250 g was dried in a dryer at 100° C. in a stream of nitrogen for 24 hours to afford dried soda lime having a bulk density of 0.78 g/mL and a moisture content of 1.0% by weight.

The dried soda lime thus obtained was subjected to a cleaning test for nitrogen gas containing tungsten hexafluoride in 1000 ppm concentration in the same manner as in Example 1. The results of the gas cleaning test are given in Table 3.

Comparative Example 2

Activated carbon of coconut shell origin having a particle size of 5 to 8 mesh and a specific surface area of 1200 $m^2$/g by BET surface area method in an amount of 180 g was impregnated with a solution of 20 g of sodium hydroxide in 40 g water, and then was dried in a dryer at 100° C. in a stream of nitrogen for 24 hours to afford cleaning agent I, which had a bulk density of 0.63 g/mL and a moisture content of 0.5% by weight and contained sodium hydroxide in an amount of 10% by weight supported thereon.

The cleaning agent thus obtained was subjected to a cleaning test for nitrogen gas containing tungsten hexafluoride in 1000 ppm concentration in the same manner as in Example 1. The results of the gas cleaning test are given in Table 3.

TABLE 1

| Example | Cleaning agent | Strontium hydroxide (Sr) | Molding aid component (M) | Molding aid molar ratio M/Sr | Molding agent component | moisture content (wt %) |
|---|---|---|---|---|---|---|
| 1 | A | octahydrate | $Ca(OH)_2$ | 0.5 | PVA | 0.9 |
| 2–6 | B | octahydrate | $Ca(OH)_2$ | 0.5 | PVA | 1.2 |
| 7 | C | octahydrate | $Ca(OH)_2$ | 0.5 | M C | 1.0 |
| 8 | D | octahydrate | $Ca(OH)_2$ | 0.1 | PVA | 1.2 |
| 9 | E | octahydrate | $Mg(OH)_2$ | 0.5 | PVA | 1.2 |
| 10 | F | octahydrate | $Ba(OH)_2 \cdot 8H_2O$ | 0.5 | PVA | 1.3 |
| 11 | G | octahydrate | $Ca(OH)_2$ + $Mg(OH)_2$ | 0.5 + 0.5 | PVA | 0.9 |

TABLE 2

| Example | Kind of fluorine-compound gas | Break through time (min) | Removal rate for fluorine-compound gas [L(gas)/L(cleaning agent)] |
|---|---|---|---|
| 1 | tungsten hexafluoride | 2223 | 40 |
| 2 | tungsten hexafluoride | 2278 | 41 |
| 3 | hydrogen fluoride | 11392 | 205 |
| 4 | fluorine | 6113 | 110 |
| 5 | Silicon tetrafluoride | 3223 | 58 |
| 6 | Boron trifluoride | 4334 | 78 |
| 7 | tungsten hexafluoride | 2167 | 39 |
| 8 | tungsten hexafluoride | 2501 | 45 |
| 9 | tungsten hexafluoride | 2056 | 37 |
| 10 | tungsten hexafluoride | 2056 | 37 |
| 11 | tungsten hexafluoride | 2167 | 39 |

TABLE 3

| Comp. * Example | Cleaning agent | Kind of fluorine-compound gas | Break through time (min) | Removal rate for fluorine-compound gas [L(gas)/L(cleaning agent)] |
|---|---|---|---|---|
| 1 | Soda lime | tungsten hexafluoride | 406 | 7.3 |
| 2 | I | tungsten hexafluoride | 311 | 5.6 |

* Comp. means "Comparative"

EXAMPLE 12

Strontium hydroxide octahydrate [$Sr(OH)_2 \cdot 8 H_2O$] in an amount of 266 g was mixed with 74 g of calcium hydroxide, and the resultant mixture was incorporated with a solution of 8 g of polyvinyl alcohol in 48 g of water under stirring. The resultant cake was extrusion molded and the extruded product was cut into pellets of 1.6 mm diameter and about 3 to 5 mm in length, which were dried at 100° C. for 24 hours in a dryer to afford 202 g of a cleaning agent J having a bulk density of 0.6 g/mL and a moisture content of 0.9% by weight in the same manner as in Example 1.

The resultant cleaning agent J was subjected to a cleaning test for nitrogen gas containing hydrogen fluoride in 1,000 ppm concentration in the same manner as in Example 1. The chemical composition of the cleaning agent J and the results of the gas cleaning test are given in Table 4 and Table 5, respectively.

EXAMPLE 13

The procedure in Example 12 was repeated to produce 160 g of cleaning agent K except that calcium hydroxide was added in an amount of 37 g instead of 74 g of the same to strontium hydroxide.

The resultant cleaning agent K, which had a bulk density of 0.5 g/mL and a moisture content of 0.9% by weight, was subjected to a cleaning test for nitrogen containing hydrogen fluoride in 1,000 ppm concentration in the same manner as in Example 1. The chemical composition of the cleaning agent K and the results of the gas cleaning test are given in Table 4 and Table 5, respectively.

EXAMPLE 14

Strontium hydroxide octahydrate [$Sr(OH)_2 \cdot 8 H_2O$] in an amount of 266 g was mixed with 14 g of calcium hydroxide, and the resultant mixture was incorporated with a solution of 6 g of polyvinyl alcohol in 36 g of water under stirring. The resultant cake was extrusion molded and the extruded product was cut into pellets of 1.6 mm in diameter and about 3 to 5 mm in length, which were dried at 100° C. for 24 hours in a dryer to afford 135 g of a cleaning agent L having a bulk density of 0.57 g/mL and a moisture content of 1.2% by weight in the same manner as in Example 1.

The resultant cleaning agent L was subjected to a cleaning test for nitrogen gas containing hydrogen fluoride in 1,000 ppm concentration in the same manner as in Example 1. The chemical composition of the cleaning agent L and the results of the gas cleaning test are given in Table 4 and Table 5, respectively.

EXAMPLE 15

Strontium hydroxide octahydrate [$Sr(OH)_2 \cdot 8 H_2O$] in an amount of 266 g was mixed with 3.5 g of calcium hydroxide, and the resultant mixture was incorporated with a solution of 4 g of polyvinyl alcohol in 24 g of water under stirring. The resultant cake was extrusion molded and the extruded product was cut into pellets of 1.6 mm in diameter and about 3 to 5 mm in length, which were dried at 100° C. for 24 hours in a dryer to afford 120 g of a cleaning agent M having a bulk density of 0.58 g/mL and a moisture content of 1.0% by weight in the same manner as in Example 1.

The resultant cleaning agent M was subjected to a cleaning test for nitrogen gas containing hydrogen fluoride in 1,000 ppm concentration in the same manner as in Example 1. The chemical composition of the cleaning agent M and the results of the gas cleaning test are given in Table 4 and Table 5, respectively.

EXAMPLES 16 to 19

The cleaning agents J, K, L and M which had been prepared in Examples 12 to 15 were each subjected to cleaning test for nitrogen gas containing fluorine in 1,000 ppm concentration in the same manner as in Example 1. The chemical compositions of the cleaning agents J, K, L and M and the results of the gas cleaning tests are given in Table 4 and Table 5, respectively.

Comparative Example 3

Strontium hydroxide octahydrate [$Sr(OH)_2 \cdot 8 H_2O$] in an amount of 266 g was mixed with a solution of 8 g of polyvinyl alcohol in 48 g of water under stirring. The resultant cake was extrusion molded and the extruded product was cut into pellets of 1.6 mm in diameter and about 3 to 5 mm in length, which were dried at 100° C. for 24 hours in a dryer to afford 120 g of a cleaning agent N having a bulk density of 0.48 g/mL and a moisture content of 1.2% by weight in the same manner as in Example 1. In the course of the preparation of this cleaning agent, the shape retainability was poor at the time of extrusion molding, and besides a part of the agent was powdered in drying.

The resultant cleaning agent N was subjected to a cleaning test for nitrogen gas containing hydrogen fluoride in 1,000 ppm concentration in the same manner as in Example 1. The chemical composition of the cleaning agent N and the results of the gas cleaning test are given in Table 6 and Table 7, respectively.

Comparative Example 4

The cleaning agent N which had been prepared in Comparative Example 3 was subjected to cleaning test for nitrogen gas containing fluorine in 1,000 ppm concentration in the same manner as in Example 1. The chemical composition of the cleaning agent N and the results of the gas cleaning test are given in Table 6 and Table 7, respectively.

TABLE 4

| Example | Cleaning agent | Strontium hydroxide (Sr) | Molding aid component (M) | molar ratio M/Sr | Molding agent component | moisture content (wt %) |
|---|---|---|---|---|---|---|
| 12. 16 | J | octahydrate | Ca(OH)$_2$ | 1 | PVA | 0.9 |
| 13. 17 | K | octahydrate | Ca(OH)$_2$ | 0.5 | PVA | 0.9 |
| 14. 18 | L | octahydrate | Ca(OH)$_2$ | 0.18 | PVA | 1.2 |
| 15. 19 | M | octahydrate | Ca(OH)$_2$ | 0.05 | PVA | 1.0 |

TABLE 5

| Example | Kind of fluorine-compound gas | Break through time (min) | Removal rate for fluorine-compound gas [L(gas)/L(cleaning agent)] |
|---|---|---|---|
| 12 | hydrogen fluoride | 8058 | 145 |
| 13 | hydrogen fluoride | 11392 | 205 |
| 14 | hydrogen fluoride | 11115 | 200 |
| 15 | hydrogen fluoride | 8614 | 155 |
| 16 | fluorine | 5557 | 100 |
| 17 | fluorine | 6113 | 110 |
| 18 | fluorine | 6115 | 110 |
| 19 | fluorine | 5003 | 90 |

TABLE 6

| Comp. * Example | Cleaning agent | Strontium hydroxide (Sr) | Molding aid | Molding agent component | moisture content (wt %) |
|---|---|---|---|---|---|
| 3 | N | octahydrate | — | PVA | 0.9 |
| 4 | N | octahydrate | — | PVA | 0.9 |

* Comp. means "Comparative"

TABLE 7

| Comp. * Example | Kind of fluorine-compound gas | Break through time (min) | Removal rate for fluorine-compound gas [L(gas)/L(cleaning agent)] |
|---|---|---|---|
| 3 | hydrogen fluoride | 2668 | 48 |
| 4 | fluorine | 1339 | 24 |

* Comp. means "Comparative"

What is claimed is:

1. A cleaning agent for removing a fluorine gas or fluorine-compound gas contained in an exhaust gas by bringing said exhaust gas into contact therewith, the cleaning agent comprises a molded article comprising strontium hydroxide, an organic binding agent as a molding agent and a hydroxide of an alkaline earth metal other than strontium, wherein said organic binder is at least one member selected from the group consisting of polyvinyl alcohol, polyethylene glycol, polypropylene glycol, methyl cellulose and carboxymethyl cellulose.

2. The cleaning agent according to claim 1 wherein said organic binding agent is incorporated in the cleaning agent in an amount of 0.1 to 40 parts by weight based on 100 parts by weight of the strontium hydroxide expressed in terms of an anhydride thereof.

3. The cleaning agent according to claim 1 wherein said hydroxide of an alkaline earth metal other than strontium is at least one member selected from the group consisting of magnesium hydroxide, calcium hydroxide and barium hydroxide.

4. The cleaning agent according to claim 1 wherein said hydroxide of an alkaline earth metal other than strontium is incorporated in the cleaning agent in a molar ratio of 0.05 to 1.0 based on the strontium hydroxide expressed in terms of an anhydride thereof.

5. The cleaning agent according to claim 1 wherein the fluorine gas or the fluorine-compound gas to be removed is at least one member selected from the group consisting of hydrogen fluoride, fluorine, tungsten hexafluoride, silicon tetrafluoride and boron trifluoride.

6. The cleaning agent according to claim 1 wherein said organic binding agent is incorporated in the cleaning agent in an amount of 0.5 to 20 parts by weight based on 100 parts by weight of the strontium hydroxide expressed in terms of an anhydride thereof.

7. The cleaning agent according to claim 6 wherein said hydroxide of an alkaline earth metal other than strontium is at least one member selected from the group consisting of magnesium hydroxide, calcium hydroxide and barium hydroxide; and said hydroxide of an alkaline earth metal other strontium is incorporated in the cleaning agent in a molar ratio of 0.1 to 0.5 based on the strontium hydroxide expressed in terms of an anhydride thereof.

8. The cleaning agent according to claim 7 wherein said hydroxide of an alkaline metal other than strontium is calcium hydroxide and said organic binding agent is polyvinyl alcohol.

9. The cleaning agent according to claim 2 wherein said hydroxide of an alkaline earth metal other than strontium is incorporated in the cleaning agent in a molar ratio of 0.05 to 1 based on the strontium hydroxide expressed in terms of an anhydride thereof.

10. A process for cleaning an exhaust gas which comprises feeding an exhaust gas containing a fluorine gas or a fluorine-compound gas into a packed column packed inside with a cleaning agent at an end of said column to remove the fluorine gas or the fluorine-compound gas, and exhausting a gas substantially free from the fluorine gas or the fluorine-compound gas at the other end thereof, said cleaning agent according to claim 1.

11. The process for cleaning an exhaust gas according to claim 10 wherein said hydroxide of an alkaline earth material other than strontium is at least one member selected from the group consisting of magnesium hydroxide, calcium hydroxide and barium hydroxide.

12. The process for cleaning an exhaust gas according to claim 10 wherein the fluorine gas or the fluorine-compound gas to be removed is at least one member selected from the group consisting of hydrogen fluoride, fluorine, tungsten hexafluoride, silicon tetrafluoride and boron trifluoride.

* * * * *